Oct. 27, 1942.   N. A. COLUCCI   2,299,739
CLUTCH
Filed July 18, 1939   8 Sheets-Sheet 1

INVENTOR
NICHOLAS A. COLUCCI.
BY
Frank Keifer
ATTORNEY

Oct. 27, 1942.   N. A. COLUCCI   2,299,739
CLUTCH
Filed July 18, 1939   8 Sheets-Sheet 3

INVENTOR
NICHOLAS A. COLUCCI.
BY
Frank Kiefer
ATTORNEY

Oct. 27, 1942. N. A. COLUCCI 2,299,739
CLUTCH
Filed July 18, 1939 8 Sheets-Sheet 5

INVENTOR
NICHOLAS A. COLUCCI.
BY
ATTORNEY

Oct. 27, 1942.　　　　N. A. COLUCCI　　　　2,299,739
CLUTCH
Filed July 18, 1939　　　　8 Sheets-Sheet 6

INVENTOR
NICHOLAS A. COLUCCI.
BY
ATTORNEY

Oct. 27, 1942.  N. A. COLUCCI  2,299,739
CLUTCH
Filed July 18, 1939  8 Sheets-Sheet 7

INVENTOR
NICHOLAS A. COLUCCI.
BY Frank Keefer
ATTORNEY

Patented Oct. 27, 1942

2,299,739

UNITED STATES PATENT OFFICE 2,299,739

CLUTCH

Nicholas A. Colucci, Rochester, N. Y.; now by judicial change of name Nicholas A. Colson Application July 18, 1939, Serial No. 285,102

13 Claims. (Cl. 192—47)

The object of this invention is to provide an improved form of over-running roller clutch or clutches, both a one-way clutch and a two-way clutch being shown in this application.

Another object of the invention is to provide a clutch in which the clutch members do not move along the axis of the clutch but the clutching effect is secured by a sleeve and a cam-shaped key attached thereto that moves along the axis of the clutch.

Another object of this invention is to provide an improved form of over-running roller clutch which is inserted inside of one of two gears, the teeth of which are constantly in mesh at all times.

Another object of this invention is to provide an improved form of over-running roller clutch which when engaged will give a direct drive between two shafts which are in line.

Another object of this invention is to provide separate two-way over-running roller clutches for each of the four speeds of an automobile transmission, the teeth of all of the gears to be in mesh at all times.

Another object of this invention is to provide a manual control for the over-running rollers in the one way clutch and also in the two-way clutch.

Another object of the invention is to provide for each of the forward and reverse speeds of an automobile, tractor, train etc. using gas engines or Diesel engines, manually controlled two-way over-running roller clutches through which the motor can drive the wheels, and through which clutch the wheels will be capable of utilizing the braking power of the motor when the wheels are rotating faster than the motor.

Another object of this invention is to provide an over-running roller clutch in which the rollers are manually pushed out of clutching position by a lever which operates cam-shaped keys which push directly against blocks or rods which in turn push the rollers out of clutching position.

Another object of this invention is to provide an over-running roller clutch in which the rollers are automatically held away from one of the clutching surfaces while the clutch is disengaged and the driving and driven members are rotating idly, thereby eliminating noise and wear.

These and other objects of the invention will be illustrated in the drawings, described in the specification, and pointed out in the claims at the end thereof.

In the drawings:

Figure 19 shows a pulley assembled with a two-way clutch.

Figure 21 is an end view of the assembly shown in Figure 19 viewed from the left.

Figure 22 is a section on the line 22x—22x of Figure 21, showing the clutch rollers and the shift mechanism.

Figure 23 is a perspective view of the roller used in Figures 21 and 22, 20, 34, 36.

Figure 24 is a section taken on the line 24x—24x of Figure 21, and shows the two rollers pushed apart by the spring.

Figure 27 is a perspective view on a large scale of the male or internal member of a two-way running clutch, being part of the assembly shown in Figures 20, 19, 33, 28, 35 and 36.

Figure 28 is an assembly of the two-way clutch and a gear, using the member shown in Figure 27.

Figure 29 is a sectional view of one type of key adapted to be used in the member shown in Figure 27.

Figure 30 is a sectional view of another type of key adapted to be used in the member shown in Figure 27.

Figure 31 is a sectional view of another type of key adapted to be used in the member shown in Figure 27.

Figure 32 is a sectional view of another type of key adapted to be used in the member shown in Figure 27.

Figure 33 shows an assembly of an automobile transmission gear with all of the gears in normal engagement, the teeth being in mesh at all times, using four of the members shown in Figure 27 with a type of key shown in Figure 34.

Figures 33a and 33b show the type of keys that are used in connection with the assemblies shown in Figures 33 and 47; that is to say, they are used only in connection with one-way engaging clutches, and are used only for engaging one clutch at a time.

Figure 48 is a side elevation of a different type of clutch, such as is used in Figure 49 and Figure 50, the assembly in Figure 49 being viewed from the left.

Figure 50 is a section through the clutch and gear, the section being taken on the line 50x—50x of Figure 49, the gear being partly broken away, and shows six rollers engaged for one direction while the other six rollers for the opposite direction are disengaged.

Figure 54 is a section on the line 54x—54x of Figure 48, showing the roller engaged between the male member and the gear.

Figure 55 is a section taken on the line 55x—55x of Figure 48, showing the two rollers held in the hanger.

Figure 57 is a side elevation of the pivot pin for the hanger of Figure 56.

In the drawings like reference numerals indicate like parts.

Figures 1, 2, 3, 4, 5, 6, 7, 8, 9, 10:
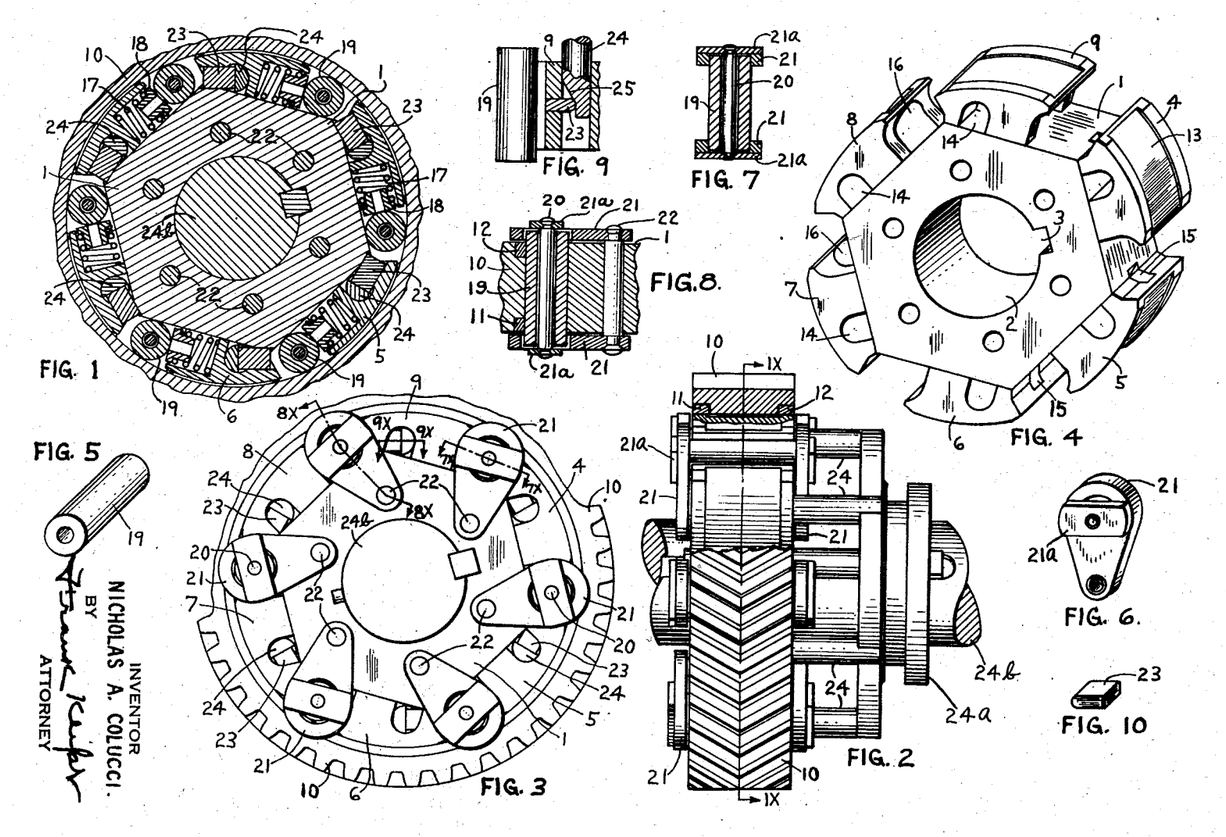
Figure 1 is a section through the one way running clutch, the section being taken on the line 1x—1x of Figure 2.
Figure 2 is a top plan view of the clutch and assembly and the herringbone gear driven thereby.
Figure 3 is a side elevation of the clutch shown in Figure 2, the assembly in Figure 2 being viewed from the left.
Figure 4 is a perspective view of the male member of the clutch that is keyed or splined to the shaft.
Figure 5 is a detail view of the roller.
Figure 6 is a detail view of the crank or arm on which the roller is idly mounted.
Figure 7 is a cross section through the arms and the roller on the line 7x—7x of Figure 3.
Figure 8 is a cross section through the gear, the roller and arms on which it is mounted, together with part of the cam surface forming part of the male member shown in Figure 4, the roller being shown in engagement with the gear and the male member of the clutch, the section being taken on the line 8x—8x of Figure 3.
Figure 9 is a section through the key rod and the block by which the roller is pushed out of engagement with the gear and the cam surface of the male member of the clutch, the section being taken on the line 9x—9x of Figure 3.
Figure 10 is a detail view of the block shown in Figures 9, 1 and 3.

In the drawings reference numeral 1 indicates a hub which is hexagon shaped and has an opening 2 central therein with which it engages a shaft. In this hub is a keyway 3, by which it is keyed to the shaft. On the flat surfaces of this hub are mounted the segments 4, 5, 6, 7, 8 and 9. These segments when assembled are segments of a cylindrical bearing on which the gear 10 can rotate freely when it is not otherwise clutched to the flat surfaces of the hub. Between the gear 10 and the segmental surfaces is provided bushings 11 and 12 which are pressed into the gear and on which the gear rides, which bushings take up the wear. It will be understood that the gear 10 is held in line with the assembly shown in Figure 4 partly because the gear is enclosed between the arms 21 and partly because it is a herringbone gear and engages with another herringbone gear, which holds it against lateral movement. Each of the segments 4, 5, 6, 7, 8 and 9 are cut away with a central channel, as indicated at 13, so that the wear is confined to the bearing surfaces on each side of this channel and to the bushings 11 and 12.

The segmental members 4 to 9, inclusive, can all be made separately and welded to the flat surfaces of the hub, or the odd numbered ones can be cast integral with the hub and the even numbered ones can be welded to the hub thereafter. Each of the segments has a hole 14 therein which passes laterally through the segment. Connecting with this hole is a slot 15 which engages therewith from one end of the segment. In the other end of the segment is a hole 16 in which is placed a spring 17 pressing a pin 18 against the clutch roller 19, which in turn is carried on a pin 20 which is carried between blocks 21a fastened on the arms 21, one of which is provided on each side of the hub and pivotally mounted on the pin 22. The ends of the pins 20 are riveted in the blocks 21a, see Figures 7 and 8. The arms 21 have holes that are slightly oval in which the ends of the rollers are carried. This permits the roller to move radially up and down in the arm to adjust itself to the cam surface of the clutch. The opening through the roller is made larger than the pin 20 to permit movement relative to the pin for the same reason. In moving in the arms the roller 19 need not and does not touch the pin 20.

The expansion of the spring 17 normally pushes the pins 18 against the rollers and holds the rollers in clutching position. As shown in Figure 1, when the hub or male member is driven counter-clockwise, or the gear 10 is driven clockwise, the rollers will clutch so that the two parts will rotate together, but when either part is driven in the opposite direction there will be no clutching engagement. Each of the segments has a hole therein at both the forward and back end. If all of these segments were cast integral with the hub, obviously these holes could not be bored into the segments, but the odd-numbered segments can be cast integral with the hub, in which case the holes could be bored into the segments from the opposite ends thereof. The even numbered segments can be made separately from the hub and after the holes are bored or cut therein the even numbered segments can be joined to the hub by welding or any other suitable manner.

As shown in Figure 1, a block 23 is provided in position to push the roller back out of clutching position, compressing the spring 17 in so doing. This block is operated by a key 24 which slides in the slot 14 and moves transversely to the block 23. This key has one or more cam surfaces 25 thereon which engages the block for the purpose of pushing it against the roller and compressing the spring 17. The block 23 slides in the slot 15. Six keys 24, all operating at the same time and in the same direction, are fastened securely to the grooved sleeve 24a which is keyed or splined to the shaft 24b on which the sleeve 24a can slide along the axis of the shaft, as shown in Figure 2.

Figures 11, 15:
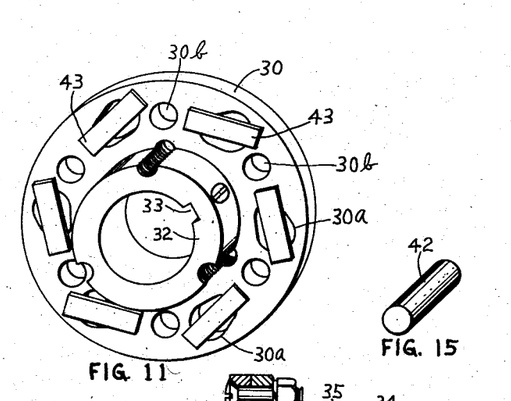
Figure 11 is a perspective view of a member that is added to the member shown in Figure 4.
Figure 15 is a perspective view of the roller used in the clutch used in Figures 12 and 13, 16, 18.
Figure 12:
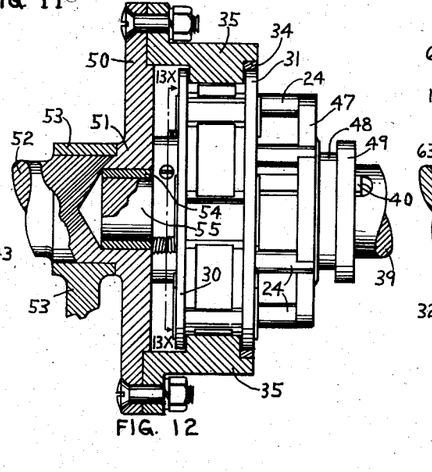
Figure 12 is a view partly in section of the completed clutch including the member shown in Figure 4, with the member shown in Figure 11 placed on the left hand side thereof, and with two shafts which are in line, the right hand shaft, with the clutch attached to it, riding in the hollow end of the left hand shaft to which is bolted a housing, with which the clutch engages or disengages.
Figure 13:
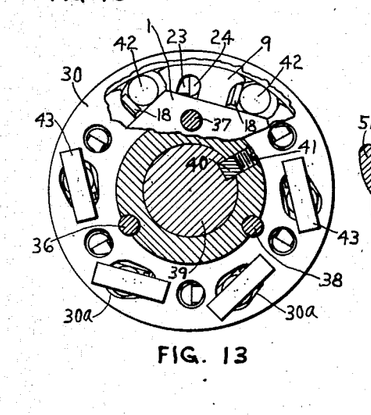
Figure 13 is a section on the line 13x—13x of Figure 12, showing the member shown in Figure 11 combined with the member shown in Figure 4, by which the member shown in Figure 4 is held against movement along the shaft in both directions.
Figure 14:
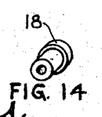
Figure 14 is a perspective view of the spring pressed pin which bears against the roller shown in Figure 1.

In Figure 12 is shown an assembly of a one-way clutch in which a hub is used similar to that shown in Figure 4. A cross section through the middle of this figure would show an assembly identical with what is shown in Figure 1, except that solid rollers are used such as is shown in Figure 15 instead of swivel rollers such as is shown in Figures 5 and 7.

The rollers are loosely mounted and are held in place between plates 30 and 31. The plate 30 is carried on a hub 32 which has a keyway 33 therein. The plate 31 is thicker than the plate 30, and when clutch is idling the plate 31 will ride freely inside of a bushing 34 which is pressed in the housing 35 which is driven by the clutch or by which the clutch is driven, as may be desired. The plates 30 and 31 and hub 32 are held together by three bolts 36, 37 and 38. The hub 32 is keyed to the shaft 39 by a key 40, which in turn is held in place by a set screw 41. The plates 30 and 31 have large egg-shaped openings 30a therein in which the ends of the rollers 42 engage. These openings are partially closed by plates 43 which hold the rollers loosely in place; that is, the rollers do not quite abut against these plates. The holes 30b are clearance holes through which the keys 24 and 44 can pass.

Mounted in the male or driving member are the keys 24 which drive the blocks 23, the assembly of which is exactly the same as that shown in Figure 9.

It will be understood that six of these keys 24 are all fastened to a plate 47, which can be moved along the shaft by a shifting lever, not shown, engaging in the groove 48 on the sleeve 49, which can be moved manually into and out of engaging and disengaging position.

The housing 35 is bolted to the flange 50 carried on the hub 51 formed integral with the shaft 52. The hub 51 is supported in a bearing 53. The right hand end of the shaft 52 has a hole drilled in it and a bushing 54 is provided therein in which rides the reduced end 55 of the shaft 39.

Figure 16:
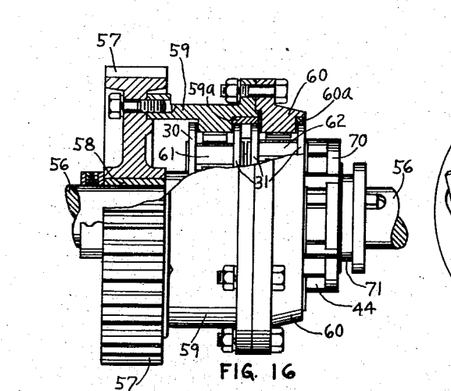
Figure 16 shows an assembly of a gear, and shaft, and housing with two oppositely disposed clutches mounted in the housing together with a shift mechanism by which either one or the other or both of the clutches can be thrown into driving engagement, or the clutches may be both placed in neutral.

In Figure 16 the shaft 56 extends clear through the assembly. On this shaft is carried a gear 57 revolving loosely thereon, a bushing 58 being provided between the gear and the shaft. This gear is bolted to the member 59, which in turn is bolted to the member 60, the members 59 and 60 constituting a housing for the oppositely disposed clutches 61 and 62 similar to those shown in Figure 18. The housings have two bushings 59a and 60a pressed into them corresponding to the bushings 68 and 69 shown in Figure 18. Each of the male members used in Figure 16 is exactly the same as that shown in Figure 4. The type and operation of the keys is exactly the same as that shown in Figures 17 and 18.

Figure 17:
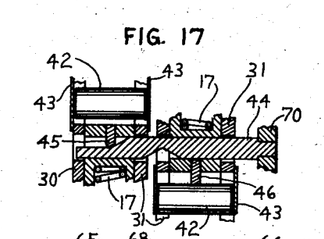
Figure 17 is a sectional view of the shift mechanism by which the clutches of Figures 16 and 18 are operated, the section being taken on the line 17x—17x of Figure 18.
Figure 18:
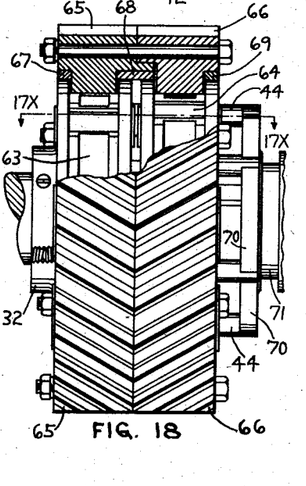
Figure 18 shows a herringbone gear with a shaft passing clear through the assembly, the gear revolving on two oppositely disposed clutches, each of which is one-way running, to either of which the gear can be connected so that the gear can drive the shaft through one clutch in one direction or be driven by the shaft through the other clutch in the same direction. The herringbone gear can be driven in the opposite direction, in which case it will drive the shaft through one of the clutches.

In Figure 18 I have shown two one-way oppositely disposed clutches 63 and 64, on which are carried the two parts 65 and 66 of the herringbone gear. These parts are suitably bolted together. Three bushings 67, 68 and 69 are interposed between these gears and the four plates corresponding to the plates 30 and 31 shown in Figure 12. In this figure the one or the other or both of the oppositely disposed clutches is connected to the gears by the operation of the keys 44 connected to the plate 70. This plate is shifted back and forth by the grooved sleeve 71. Figure 17 shows the keys 44 which drive the blocks 45 and 46, which are all mounted in a male member similar to that shown in Figure 4. Figure 17 also shows the position the key occupies when the one-way clutch 63 is engaged.

Figure 26:
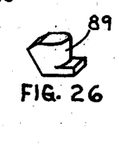
Figure 26 is a perspective view of the block by which the rollers are pushed out of engaged position.
Figures 27, 28, 29, 30, 31, 32, 33, 33A:
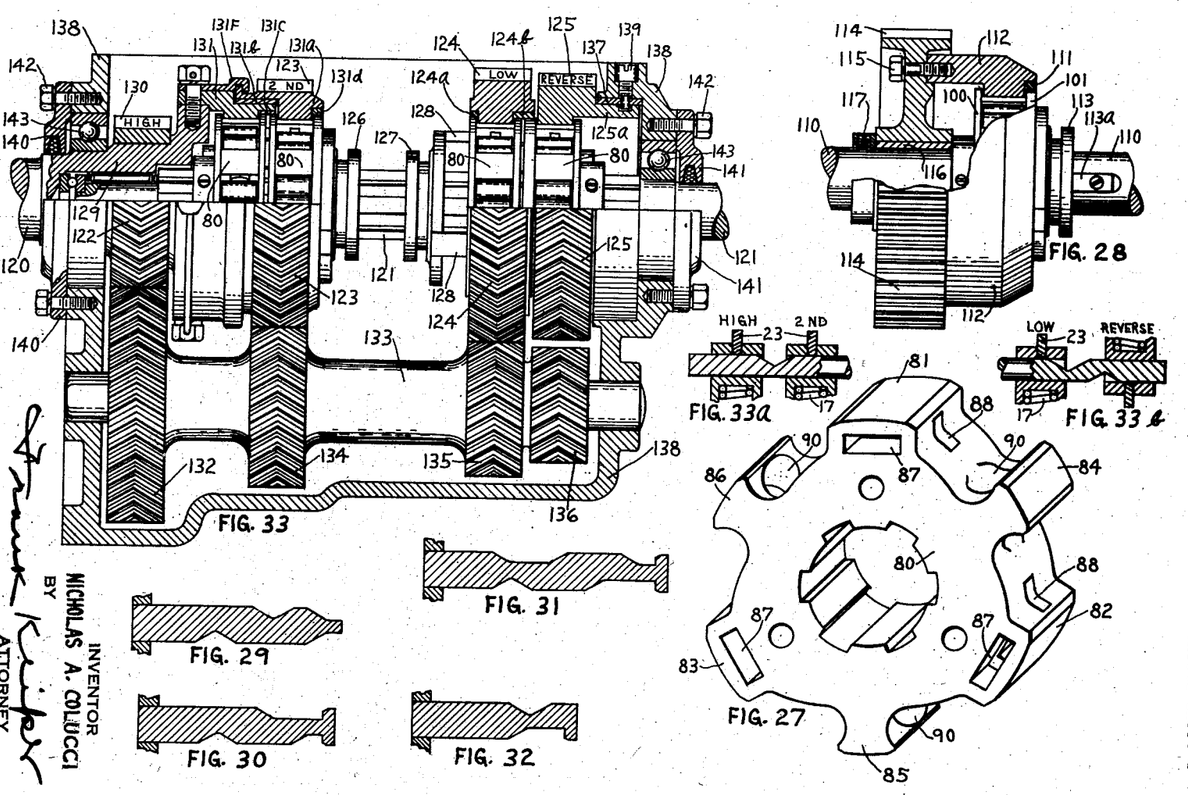
Figure 36:
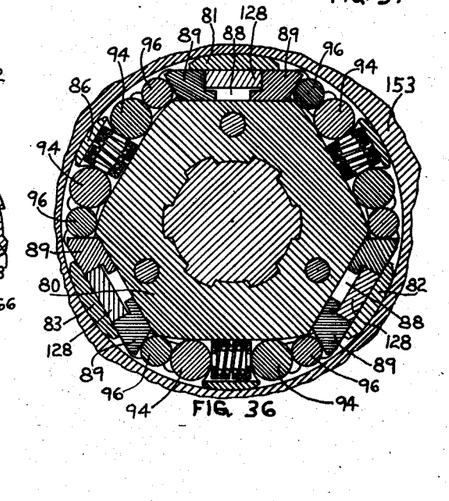
Figure 36 is a section on the line 36x—36x of Figure 35, showing a male member substantially the same as is shown in Figure 27, with the rollers disengaged.

In Figure 27 I have shown a modified form of the male member 80 of the clutch, which is cast all in one piece. This member is used in the assembly shown in Figure 20. As shown in Figure 27, the member 80 has three wide segments 81, 82, and 83 and three narrow segments 84, 85, and 86. The wide segments have the key-ways 87 therein and also the slots 88, on opposite sides thereof, in which slide the blocks 89 shown in Figure 26. The small segments have the round holes 90 therein, in which are provided the double-ended springs 91 shown in Figure 20. The opposite ends of the springs 91 engage in cups 92, which in turn engage against the large rollers 94 and normally tend to push the large rollers and the small rollers 96 into clutching engagement. The key 97, shown in Figure 22, operates on oppositely disposed blocks 89. When the key is in the position shown in Figure 22, the clutch rollers are in engagement all around the assembly shown in Figure 20, so that the shaft 98 and clutch will drive either the gear or pulley 99 in either direction. When the key 97 is moved longitudinally through the first step, the block 89 will be moved to the left and will disengage one set of rollers; that is, the odd numbered sets of rollers around the assembly Figure 20, and when it is moved still further it will also move the block 89 on the right and disengage the even set of rollers. In the position shown in Figure 22, it will drive the gear or pulley in both directions. In the second position above described, it will drive the gear in but one direction, and in the third position it will leave the gear or pulley free to rotate in either direction independent of the clutch, both sets of rollers being then disengaged, as shown in Figure 36.

The end of the key 97 is T-shaped, so that the flanges on the end thereof will engage with the blocks 89 and be limited in its outward movement. The flanges also bear on the side of the keyway, which acts as a guide for the outer end of the key. The same applies to the ends of the keys shown in Figures 30, 31, 32.

The three keys 97 are permanently fastened to a sleeve 97a having a groove therein by which the keys are moved along the axis of the shaft 98 into and out of engaging position. The sleeve 97a is prevented from rotating relative to the shaft 98 by keys 97b or splines along which it can slide, as is shown in Figure 19.

Figures 20, 25:
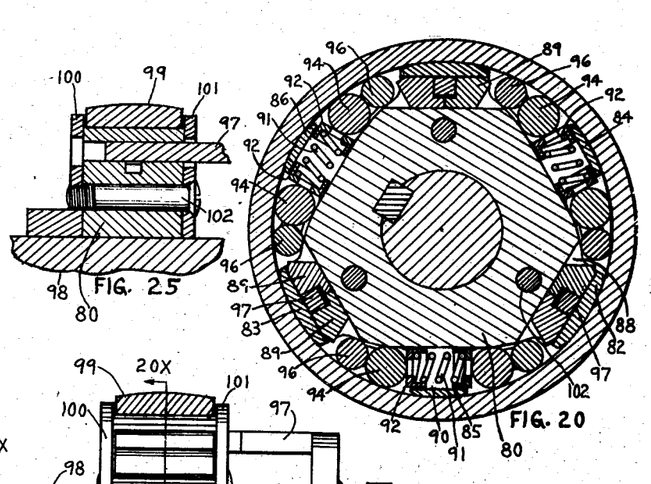
Figure 20 is a transverse section on the line 20x—20x of Figure 19, showing a two-way running clutch, with the rollers engaged.
Figure 25 is a section on the line 25x—25x of Figure 21, and shows the two guide plates fastened securely to the male member of the clutch with the pulley loosely enclosed between the two plates.

On either side of the male member 80 is provided the plates 100 and 101, which are fastened to the male member by means of bolts 102, as shown in Figure 25. These plates are provided with openings therein, as indicated at 103 in Figures 21 and 37. In these holes loosely engages the trunnions 104 of the large rollers 94 and the small rollers 96. The outer edge of these slots is eccentric to the center of the rotation, with the result that when the springs are compressed the rollers are held out of engagement with the pulley or gear surrounding the male member. The rectangular holes 103a are clearance holes through which the keys 97 and 128 can pass The plates 100 and 101 act as flanges to hold the pulley 99 positively in correct position.

In Figure 28 I have shown a solid shaft 110 which goes clear through the clutch and gear, by which it is driven or which may be driven by the shaft. In this assembly the male member 80 is used and plates 100 and 101, such as are shown in Figure 19. Surrounding the plate 101 is a bushing 11, which is interposed between the plate 101 and the housing 112. This bushing and all similar bushings are pressed into their seat so that they are practically rigid with the housing of which they form a part.

In Figure 28 I have shown a sleeve 113 having a groove therein by which the sleeve and keys are moved along the shaft into and out of engaging position. The sleeve 113 is splined on the shaft by the key 113a. Attached to this sleeve any kind of key can be used, such as is shown in Figures 29, 30, 31, 32, 22, 46, 55. Three keys, all alike, will in any case be attached to this sleeve and will be operated simultaneously thereby.

In this assembly rollers and springs similar to those shown in Figures 20, 23 and 24 are used and a cross section through the male member and its rollers would be like the corresponding part in Figure 20 when engaged with the housing 112, it being understood that in Figure 28 the housing 112 is substituted for the pulley 99.

Fastened to the housing 112 is the gear 114. This gear is fastened to the housing by screws or bolts 115. Interposed between the gear and the shaft is the bushing 116, which is a pressed fit in the gear. The gear and assembly is held in correct alignment on the shaft by a collar and set screw 117, and by the hub and set screw of plate 100.

In Figure 33 I have shown an assembly of four sets of gears such as are commonly used in an automobile, that is, gears for high speed, intermediate, and low speed, and for reverse. It is understood that an idler is used in connection with the reverse gear, which idler is not shown. In this figure there is a shaft 120 at the left hand end and a shaft 121 at the right hand end. The shaft 121 extends through the assembly and the end of it is reduced and journaled in the right hand end of the shaft 120, this being common construction.

On the shaft 121 is keyed permanently the male members of all four clutches, which male members are preferably like that shown in Figure 27. These members are connected to the three gears 123, 124 and 125 and the housing 131 that surround them by clutch mechanisms such as is shown in Figure 20, it being understood that the housing 131 and the three gears 123, 124 and 125 are substituted for the pulley 99 shown in Figure 20. It is also understood that the large holes in the male members of the clutch are splined, as shown by the keyway in Figure 27, instead of using a key way as is shown in Figure 20.

Two sleeves 126 and 127 are shown splined on the shaft 121. These sleeves are operated by a single shift lever by a mechanism that is standard construction in automobiles generally and which forms no part of this invention except as it is necessary in the complete assembly. By this mechanism each sleeve is moved from neutral position to active position and back again to neutral position independent of the other sleeve, it being understood that only one sleeve can be moved from neutral position at a time.

Figures 34, 38:
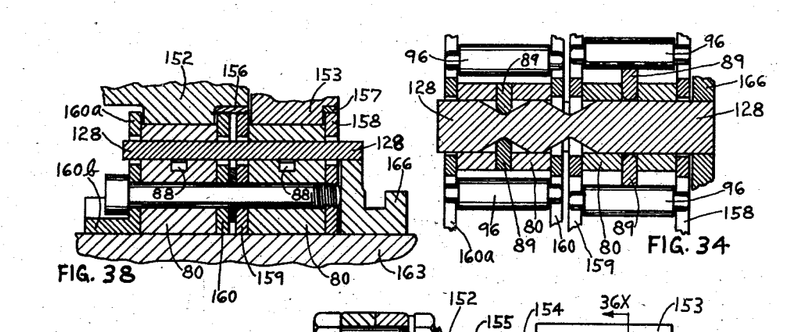
Figure 34 shows the type of key and assembly used in connection with the member 27, the section being taken on the line 34x—34x of Figure 35.
Figure 38 is a sectional view taken through any one of the three bolts shown in Figure 36, showing how the two clutches are positively fastened together.

As shown in Figure 33 the sleeve 126 is moved so that the keys 128 connected therewith are moved to the position shown in Figure 34. In this case the high gear 130 is driven by the shaft 120 through the housing 129 forming a part thereof, to which the high gear is keyed. To the housing 129 is bolted the housing 131, which forms the female member of the clutch by which the shaft 121 is driven at high speed or direct drive. In this case the gear 130 meshes with the gear 132, which is integral with the shaft 133. On this shaft is also integral the gears 134, 135 and 136, all of which revolve idly when the car is driven at high speed, or by direct drive.

The gear 134 meshes with the gear 123, the gear 135 meshed with the gear 124, and the gear 136 meshes with the idler, which in turn meshes with the gear 125 by which the reverse drive is secured. While the shaft 121 is driven at high speed, all of the nine gears above enumerated rotate idly, no power being communicated to the gears. When the lever is shifted to second position the gear 130 drives the gear 132, and this in turn drives the gear 134 through the shaft 133. This gear 134 drives the gear 123, which through its clutch drives the shaft 121. In such case the key 128 is moved to the right, so that the blocks 89 at the left of the figure are spread apart into engagement with the rollers, and the blocks 89 at the right of the figure are drawn together out of engagement with the rollers, the driving position of the rollers in each case being shown in section in Figure 20, and the idle position of the rollers being shown in section in Figure 36.

Before the shift lever is moved to low speed drive, the sleeve 126 must first be moved to the right, that is, toward the center of Figure 33, which is neutral position. Then the sleeve 127 is moved to the left away from the neutral position shown in Figure 33. In such case the key 128 would be moved to the left. The position of the key can be visualized by holding the Figure 34 inverted and the key 128 would be moved to the position which would permit the left hand blocks 89 to come closer together, which would close the clutch that drives the gear 124, the rollers being in the position shown in Figure 20. While the keys 128 are in this position, the clutch that drives the reverse gear would be in idle position which is shown in Figure 36. In this case the gear 130 would drive the gear 132, the shaft 133, the gear 135, which in turn would drive the gear 124, which in turn would be clutched to the shaft 121 which would be driven thereby.

When the sleeve 127 is moved to the right from the position shown in Figure 33, then the key 128 would be moved to the position shown in Figure 34 inverted, in which case the gear 125 would be driven from the gear 136 through the idler not shown. This gear 125 through its clutch would drive the shaft 121 in the reverse direction.

The housing 131a is provided with a bushing 131b which rides freely on the housing 131. In the housing 131 is a bushing 131c which rides on the two plates similar to the plate 158 shown in Figure 37, except that the holes 167 are not threaded, and the housing 131a has a bushing 131d therein which rides on a plate exactly similar to the one shown in Figure 37.

The cylindrical housing 131 is covered by a cylindrical shell 131f. This shell 131f is interlocked with the housing 131a by a groove 131g which engages with the flange on the housing 131a. This permits the housing 131a to turn relatively to the housing 131 and 131f but can not move laterally relative thereto. The housing 131f is divided into two half cylinders to make possible the assembly thereof with the housing 131a.

The low speed gear 124 is provided with bushings 124a and 124b which ride on the plates of the two clutches shown at the right in Figure 33. The reverse gear 125 is provided with a collar 125a which has an annular groove therein. A bushing 137 is provided into the transmission housing 138, and a screw 139 passes through the bushing and engages in the groove in the collar 125a.

On each end of the assembly shown in Figure 33 plates 140 and 141 are shown, which are bolted to the assembly. These plates are grooved and in these grooves are placed a felt washer which holds the oil in the assembly and prevents it from leaking out along the shaft. These plates are fastened to the housing by bolts 142. Within the housing at each end ball bearings 143 are provided in which run the shafts 120 and 121. With the gearing arranged as is shown in this assembly, the gears are always in mesh and only one clutch is engaged at a time, and this assembly uses the standard shift now in general use so that the teeth of the gears cannot dead center on each other in the shifting of gears.

With the assembly shown in Figure 33, if the rear wheels at any time revolve faster than they would be driven by the engine shaft 120 at that time, the clutch in engagement becomes a brake on the rear wheels and utilizes the braking power of the motor to retard the excess speed of the car. This is due to the fact that a two-way clutch is used such as is shown in Figures 27, 20, and 36.

By replacing the keys 128 with the keys shown in Figures 33a and 33b, this braking effect would not occur and the car would run free wheeling in every speed and would have to be controlled entirely by the brakes.

Figures 34A, 35:
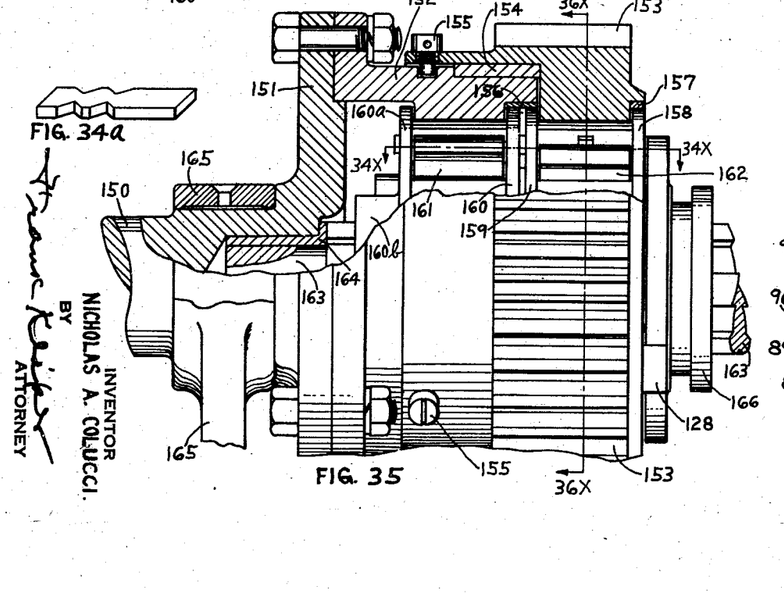
Figure 34a is a perspective view of the key shown in Figure 34.
Figure 35 is an assembly of a gear and two clutches, each of which is a two-way clutch, the clutches being permanently keyed to the right hand shaft and the housing being bolted securely to the left hand shaft, the gear riding freely on the housing, the clutches being capable of being alternately engaged with the gear or being engaged with the housing but not engaged with both at the same time. The gear can be connected to the left hand shaft by using a countershaft on which are keyed two gears, one of which meshes with a gear keyed to the shaft 150 and the other gear meshing with the gear shown in Figure 35.

In Figure 35 I have shown an assembly of the two shafts and the housing and clutches nearly corresponding to the left hand part of the assembly shown in Figure 33. This assembly would be used for other purposes than automobile driving, such as in factory installations, etc.

In Figure 35 the shaft 150 is provided having a flange 151 on the end thereof, which forms part of the housing for the clutch. Bolted to the flange is the cylindrical housing 152. On this housing rides a gear 153 having a bushing 154 pressed therein. This gear with its bushing rides freely on the housing 152 and turns thereon. A key 155 is provided in the form of a screw, the end of which engages in an annular groove in the housing 152. This holds the gear 153 from moving laterally on the housing while it turns thereon. Bushings 156 and 157 are pressed in the housing 152 and gear 153. These bushings ride on the plates 158, 159, 160, forming part of the clutches.

Two clutches are provided 161 and 162, each of which is a two-way clutch such as is shown in Figure 36. Both of these clutches are keyed to the shaft 163, which can drive the clutches or be driven thereby. The left hand end of the shaft 163 is reduced as shown at 163 and rotates in a bearing provided in the shaft 150 therefor. A bushing 164 is provided therefor. The shaft 150 rotates in the bearing 165.

Splined on the shaft 163 is the sleeve 166, which can move along the shaft. Connected to this sleeve are keys such as is shown in Figure 34. With the keys in the position shown in Figure 34 the clutch 161 is engaged and will cause the shaft 163 to be driven directly by the shaft 150 or vice versa. In such case the gear 153 can rotate idly, because the clutch within the gear is disengaged as shown in Figures 36 and 34.

By moving the key 128 a short distance to the right both clutches can be disengaged. By moving it still further to the right the clutch 162 will be engaged and the clutch 161 will remain disengaged. In such position the gear 153 would be driven by the shaft 163, and the shaft 150 could remain idle, or be driven by any arrangement of gearing that might be desired from the gear 153. With the key in this same position the shaft 163 could also be driven from the shaft 150 by an arrangement of gearing which would drive the gear 153, which in turn would drive the engaged clutch 162 and thereby transmit power to the shaft 163.

Figure 37:
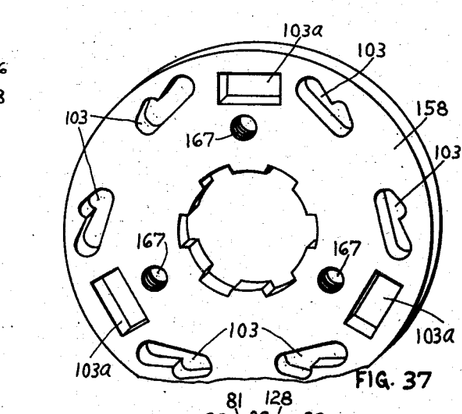
Figure 37 shows a perspective view of a flange plate that holds the rollers in place and guides them into engaging or disengaging position. These plates are bolted on the opposite sides of the male member shown in Figure 27, and one of them will have three plain holes instead of the three threaded holes shown in Figure 37.

The plate 158 is shown in perspective in Figure 37. The other three plates of the clutch will be substantially like this except that the holes 167 need not be threaded and the plate 160a will be provided with a hub 160b.

Figures 39, 40, 41, 42, 43, 44, 45, 46, 47:
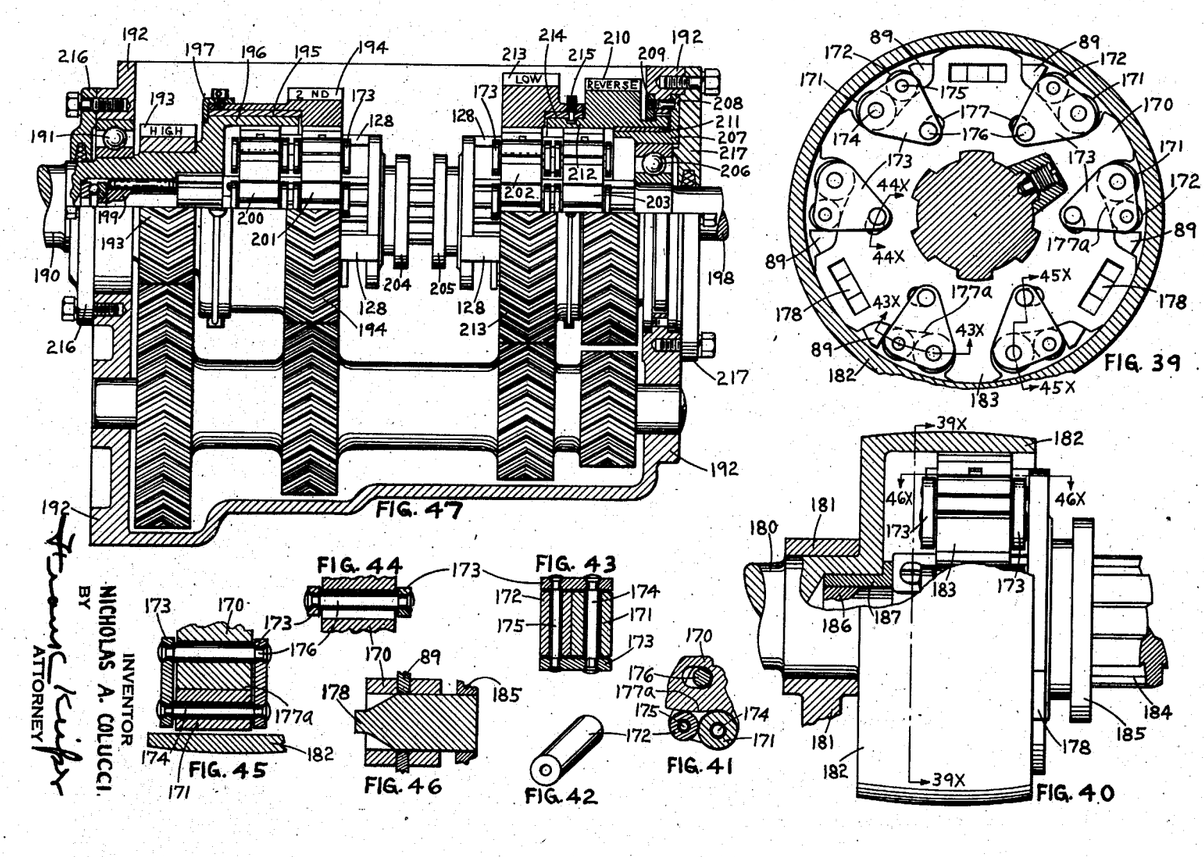
Figure 39 is a sectional view through another type of two-way clutch, the section being taken on the line 39x—39x of Figure 40.
Figure 40 is a side elevation, partly broken away in section, of the two-way running clutch shown in Figure 39 combined with two shafts in line, the right hand shaft having the clutch securely fastened to it, and the left hand shaft having a housing in which the clutch is inserted and to which it can become engaged or not as desired.
Figure 41 is a detail sectional view of the one set of rollers and the hanger therefor, showing the two rollers in disengaged position.
Figure 42 is a perspective view of one of the rollers used in Figures 39 and 41 and 47 and 40.
Figure 43 is a section on the line 43x—43x of Figure 39.
Figure 44 is a section on the line 44x—44x of Figure 39.
Figure 45 is a section on the line 45x—45x of Figure 39, and shows the roller with the two arms in the disengaged position.
Figure 46 is a section on the line 46x—46x of Figure 40, the section being taken through the key, the key being placed in disengaged position.
Figure 47 shows an assembly of an automobile transmission gear, with all the gears in normal engagement, the teeth being in mesh at all times, using four of the members shown in Figure 39 with the type of key shown in Figure 34.

In Figures 39 and 40 I have shown an assembly suitable for manufacturing purposes. In this assembly the two-way clutch is provided with a male member 170, which is substantially like the male member 80 shown in Figure 27. In this clutch the side plates on the clutches such as are shown in Figure 33 are dispensed with and the rollers 171 and 172 are carried between two hangers 173. The two hangers, which are placed on opposite sides of the member 170, are held together by three pins which are riveted therein. These pins are numbered 174, 175, and 176. The pins 174 and 175 carry the rollers 171 and 172 and the pin 176 engages loosely in the slot 177, so that it can slide back and forth therein. This slot 177 is parallel to the cam surface 177a and serves to hold the hangers and rollers from being thrown out radially by centrifugal force when in disengaged position, as shown in Figure 39. It also acts as a guide to bring the rollers into engaging position. The rollers are moved into engaging position by springs, just as is shown in Figure 20, and they are moved out of engaging position by blocks such as are shown in Figure 26, which are operated by keys 178 such as are shown in Figure 46.

As shown in Figure 40, a shaft 180 is provided mounted to rotate in a bearing 181. On this shaft is a pulley or housing 182 integral therewith. The clutch 183 such as is shown in Figure 39 is placed inside of the pulley. A shaft 184 is provided in line with the shaft 180, on which shaft 184 the sleeve 185 is splined. This sleeve moves the keys 178. The shaft 184 has a reduced end 186 which rotates in a bushing 187 carried in the shaft 180.

In Figure 47 I have shown an assembly of automobile transmission gears similar to that shown in Figure 33. In this assembly each of the clutches is provided with an assembly similar to that shown in Figure 39. A shaft 190 is provided at the left. This shaft has an expanded end. On this shaft is a ball bearing 191 that is supported by a stationary housing 192. On the expanded end of the shaft the high gear 193 is keyed. The second gear 194 has a bushing 195 therein which rotates on the expanded end 196 of the shaft 190. A flange plate 197 is provided on the gear 194 which overlaps the bushing 195 and the expanded end 196 of the shaft, which holds the gear 194 against moving to the right. It is held from moving to the left by the expanded end 196 of the shaft.

A shaft 198 is provided at the right which extends clear through the assembly and is provided with a reduced end 199 that engages in a bearing provided in the shaft 190. The clutches 200, 201, 202, and 203 are all keyed to the shaft 198 and either drive the shaft or are driven thereby. The clutches are engaged or disengaged from the shaft by the sleeves 204 and 205, which sleeves are shown in Figure 47 in neutral position. These sleeves operate keys such as is shown in Figure 34. The shaft 198 is carried by a ball bearing 206, which is carried by a flanged collar 207 carried on the stationary housing 192. The flanged collar 207 is fastened to the housing 192 by a screw 208. The threaded end of this screw engages in a semicircular ring 209, which in turn engages in a groove provided in the right side of the reverse gear 210. This gear is provided with a bushing 211, which rides on the flanged collar 207. The reverse gear is driven by the clutch 203, or is driven thereby. On the reverse gear is a hub 212 on which rides the low gear 213 which is provided with a bushing 214 which rides on the hub 212. A screw 215 is provided that engages in an annular groove in the hub 219, which holds it against endwise movement. On the ends of the housings are the plates 216 and 217 which carry felt washers which hold the oil in the assembly and prevents it from leaking out along the shaft. The gears are clutched and operated in substantially the same way as is described above in connection with Figure 33.

Figures 49, 51, 52, 53, 56:
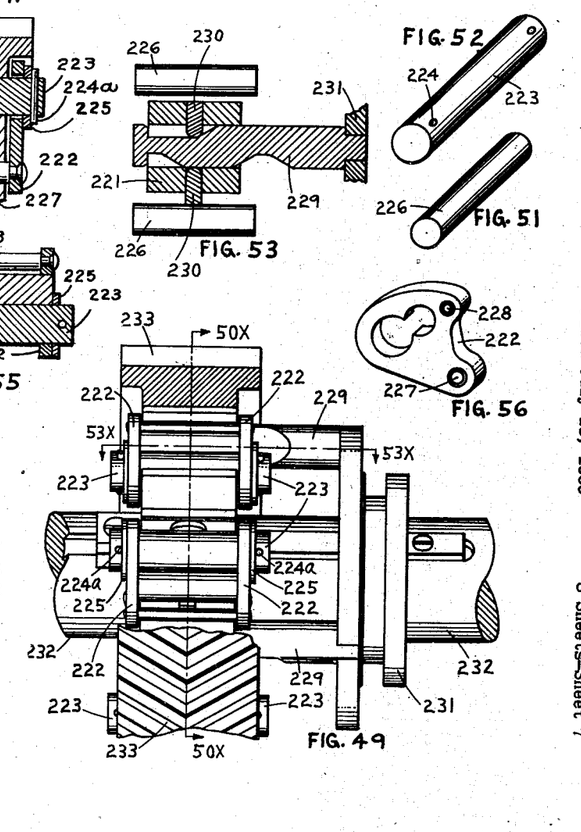
Figure 49 is a side elevation, partly broken away in section, of the clutch and gear shown in Figure 48.
Figures 51 and 52 are perspective views of the rollers shown in Figure 50.
Figure 53 is a section through the key taken on the line 53x—53x of Figure 49, the key being round.
Figure 56 is a perspective view of one of the hangers.

In Figure 50 I have shown another modification of the clutch which is substantially like the clutch shown in Figures 20 and 36 except that the keys are round in cross section instead of being rectangular as are the keys shown in Figures 20 and 36. The shape of the male member 220 is substantially the same as that shown in Figure 27, except that the segment 221 outside of the round keys is rounded off as shown at the top of Figure 48. In the assembly shown in Figure 48 two hanger plates 222 are used, such as are shown in Figure 56. Each hanger plate has two openings therein, one large and one small, and through the larger opening extends the larger roller 223. The rollers 223 are provided with pin holes 224, in which are inserted pins 224a by which the rollers are held against endwise movement. Washers 225 are provided on the roller 223 inside of the pins. The smaller roller 226 extends into the small opening in the hanger 222 and flush with the outside of the hanger. The washers 225 overlap the small rollers and hold the small rollers in place, as shown in Figures 54 and 55. The hangers swing on pins 227, the ends of which are riveted into the hangers. A similar pin 228 with its ends engaged and riveted into the hangers is shown in Figures 48, 50 and 55. Between these two pins the hangers are held properly in line with each other. The two holes in the hanger plates 222 are slightly oval, which permits the rollers to move radially up and down so that they will adjust themselves to the cam surface of the clutch as shown in Figures 48, 50 and 54.

In Figures 50 and 53 I have shown the cylindrical keys 229 which are used for moving the blocks 230, which blocks engage the small rollers as shown in Figure 50. As shown at the top of Figure 50, the odd-numbered rollers on the left of the key 229 are in clutching position and the even-numbered rollers on the right of the key are moved out of clutching position.

As shown in Figures 50 and 53, this position of the keys and rollers will give a counterclockwise direction to the gear 233 when the shaft and clutch is the driver, and when the gear is the driver it will give a clockwise direction to the shaft 232.

In Figure 53, when the key 229 is moved to the right as far as it will go the lower block 230 will be drawn closer to the upper block 230 which will still remain in the same position as is shown in Figure 53. With the keys 229 and the blocks 230 in this new position, all the twelve rollers shown in Figure 50 will then be in driving engagement, which means that the shaft 232 and clutch will be able to drive the gear in either direction, or the gear can drive the clutch and shaft in either direction.

When the keys 229 are moved one step to the left from the position shown in Figure 53, the upper blocks 230 will be pushed apart from the lower blocks a distance equal to the diameter of the key 229 and will come to rest on the round surface of the key 229. With the three keys 229 in this new position the upper blocks 230 will then have pushed all of the six rollers to the left of the keys shown in Figure 50 out of driving engagement, in which position the gear can not drive the shaft nor can the shaft drive the gear. This position is known as neutral position.

When the three keys 229 are moved to the left one step further from the position just described the lower blocks 230 will move upward into the V-shaped slot at the right of the key 229, thereby allowing only the six rollers to the right of the three keys 229 shown in Figure 50 to enter into driving engagement with the gear and male member of the clutch while the other six rollers to the left of the three keys 229 will still remain out of driving engagement. The position of all the rollers will then be exactly opposite to that shown in Figure 50.

With this new position of the three keys 229, the six blocks 230 and the twelve rollers, the shaft will be capable of driving the gear in a clockwise direction only and the gear will be capable of driving the shaft in a counterclockwise direction only.

This is also true of the other odd-numbered rollers and the other even-numbered rollers shown in Figure 50. The key 229 shown in Figure 53 and is operated by the sleeve 231. A shaft 232 is provided which goes through the clutch and to which the male member of the clutch is keyed. The sleeve 231 is splined or keyed thereon. A herringbone gear 233 is shown, which drives or is driven by the clutch. This gear is held in line with the clutch partially by the hanger plates 222 which engage the sides of the gear and by the shape of the teeth on the herringbone gear, which engages with another herringbone gear.

It will be understood that in all these clutches the keys are all connected to one sleeve and move together. In the one way clutches six keys are used and all these keys operate at the same time and in the same direction to either open or close the clutch. In the two way clutches but three keys are used (except as shown in Figure 58) and these keys operate in one direction when moved to one position and operate in the other direction when moved to a second position; that is, all the keys are in neutral position at one time and when moved to the first position from neutral they cause the clutch to drive in one direction, and when moved to a second position they cause the clutch to drive in the reverse direction.

Figure 58:
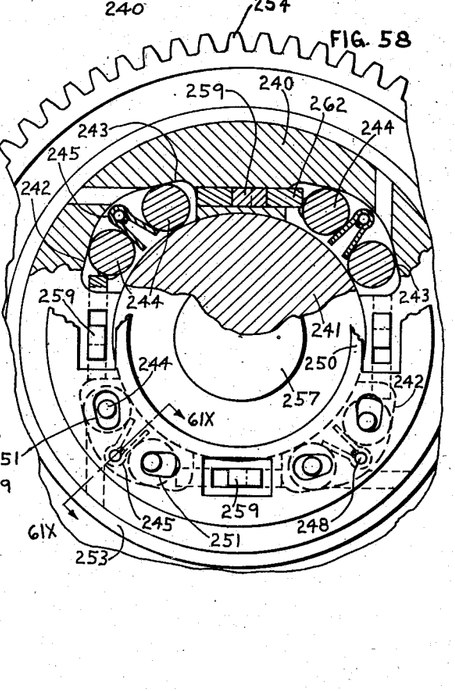
Figure 58 is a sectional view of a modified form of my clutch, showing the male member in the form of a cylinder and showing the eccentric surfaces, rollers, springs, blocks and keys carried in the female member of the clutch.

In Figures 58 to 64, inclusive, I have shown a modified form of the clutch in which reference numeral 240 represents the female member, 241 indicates the male member. The female member is provided with eccentric surfaces 242 and 243, in which are placed the rollers 244 arranged in pairs. Between the rollers is placed a double blade spring 245 made in one piece, having sleeves 246 formed on the end thereof and blades 247 intermediate the sleeves. The sleeves of the spring are swiveled on the pin 248, the ends of which are headed up and hold the flange plates 249 and 250 firmly attached to the female member of the clutch. The male member and the rollers are held against lateral movement by these flange plates. The flange plates are slotted, as indicated at 251, to permit eccentric movement of the rollers, so that the rollers can be held away from engagement with the male member while the clutch is idling. In this type of clutch four pairs of rollers are shown, instead of three pairs of rollers in the type shown in Figures 20, 21, 36, 39, and 50. The clutch shown in Figure 58 is a two-way clutch and can drive or be driven in either direction. As shown in Figure 58, four rollers are engaged and four rollers are in idle position. This corresponds to the showing of Figure 50, in which three pairs of rollers are shown engaged and three pairs of rollers are shown in idle position. This showing, of course, depends upon the position of the keys 229 and 259.

As shown in Figure 58, the male member is made solid with the shaft or it can be keyed thereto. The female member has a flange 252 thereon, with a boss 253 thereon, by which it is bolted to the gear 254. This gear has a hub 255 in which a bushing 256 is pressed which rides on the shaft 257. In the web 258 of the gear 254 is placed slots at suitable intervals in which slide the keys 259. The keys 259 are positively connected to and controlled by the sleeve 260, which slides on the hub 255 and is splined thereon by the key 261. Blocks 262 are pushed by the keys and in turn push the rollers 244 into idle position.

Figures 59, 60, 62, 63, 64:
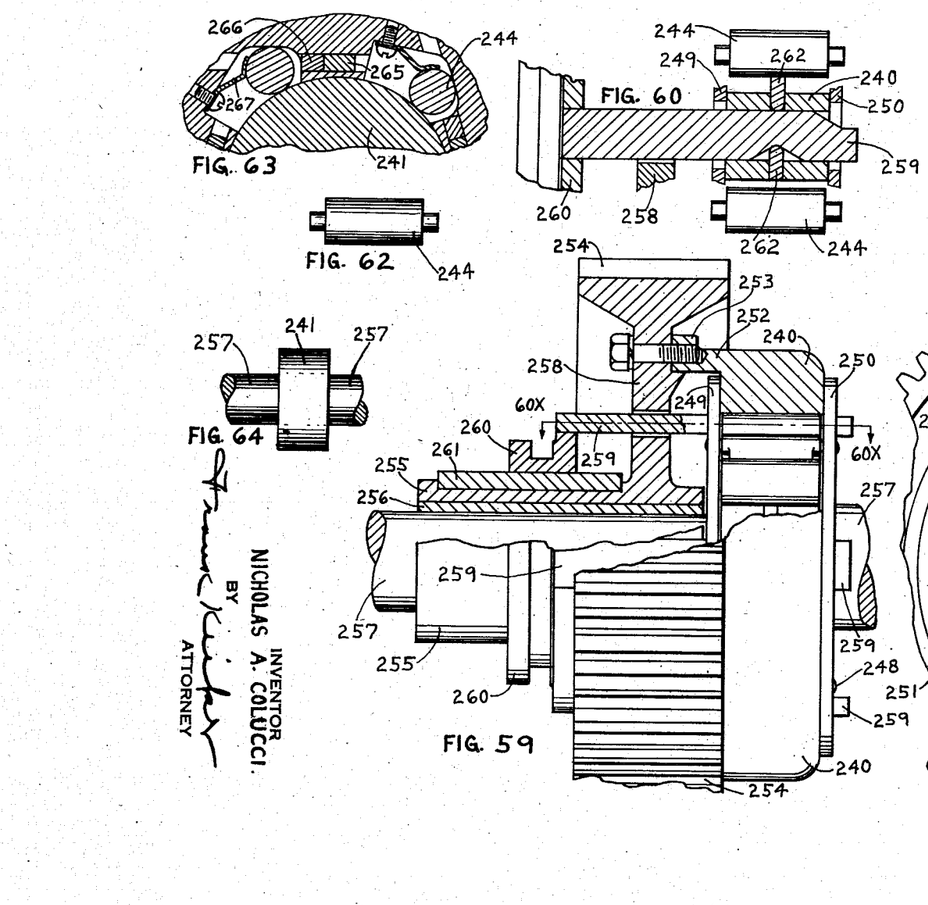
Figure 59 is a side elevation of the assembly partly in section, showing flange plates fastened to the female member.
Figure 60 is a horizontal section on the line 60x—60x of Figure 59.
Figure 62 is a side elevation of one of the rollers used in this type of clutch.
Figure 63 shows a small sectional view of the female member as it would appear in a one-way clutch.
Figure 64 is a detail view on a small scale of the male member of the clutch shown in Figures 58 and 63.
Figure 61:
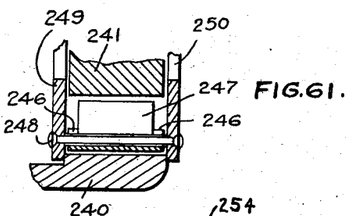
Figure 61 is a section on the line 61x—61x of Figure 58.

It will be understood in the type of clutch shown in Figures 58 and 59 the keys are held in the female member and will pass through the web of the gear driven thereby, while in the other types of clutches the keys are carried in the male member and are independent of the female member and the gear driven thereby.

As shown in Figure 63, the rollers 244 are pushed to idle position by the keys 265 and blocks 266. These rollers are normally held in clutching position by the springs 267.

It will be understood that the assembly shown in Figures 33 and 47 would be enclosed in a housing which would be partially filled with oil, so that all the parts would be lubricated either by immersion or splash lubrication. All the other types of assemblies could be immersed in oil, if so desired, except those that drive or are driven by a belt.

It will also be understood that wherever bushings are shown, such as 11 and 12 in Figure 2, which make contact with the cylindrical segments such as are shown in Figure 4, that the bushings and cylindrical surfaces make a good running fit.

I claim:

1. A clutch having a female member, a male member having its axis concentric with and being inside of the female member, rollers interposed between the male member and the female member, said rollers being normally held in clutching engagement, a key moving parallel to the axis of the clutch for pushing the rollers out of clutching engagement, said key being located near the periphery of the male member and having a cam thereon adapted to push the rollers out of clutching engagement, a guide in the male member in which said key moves and by which it is held to a straight line movement, a shaft on which said male member is mounted and to which it is keyed.

2. A clutch having a female member with an internal cylindrical clutching surface, a male member having its axis concentric with the female member and being placed inside the female member and having clutching surfaces eccentric to the female member, rollers interposed between the male member and the female member, said rollers being normally held in clutching position, a key moving parallel to the axis of the clutch for pushing the rollers out of clutching position, said key being located near the periphery of the male member and having a cam thereon adapted to push the rollers out of clutching engagement, a guide in the male member in which said key moves and by which it is held to a straight line movement, a shaft on which said male member is mounted and to which it is keyed.

3. A clutch having a female member with an internal cylindrical clutching surface, a male member having its axis concentric with the female member, the male member being placed inside of the female member and having clutching surfaces eccentric to the female member, and having bearing surfaces interposed between the clutching surfaces that are concentric to the female member, the female member being adapted to ride on such bearing surfaces, rollers interposed between the eccentric surfaces of the male member and the female members, said rollers being normally held in clutching position, keys moving parallel to the axis of the clutch for pushing the rollers out of clutching position, each of said keys being located near the periphery of the male member and having a cam thereon adapted to push the rollers out of clutching engagement, guides in the male member in which said keys move and by which they are held to a straight line movement, a shaft on which said male member is mounted and to which it is keyed.

4. A clutch having a female member with an internal cylindrical clutching surface, a male member having its axis concentric with the female member, the male member being placed inside of the female member, and having clutching surfaces eccentric to the female member, and having segmental members projecting radially and interposed between the clutching surfaces, bearing surfaces on said segmental members that are concentric with the female member and on which the female member is adapted to ride, rollers interposed between the female member and the eccentric surfaces of the male member, springs for normally holding said rollers in clutching position, keys moving parallel to the axis of the clutch for pushing the rollers out of clutching position, said segmental members serving as housings for said springs and said keys, each of said keys being located near the periphery of the male member and having a cam thereon adapted to push the rollers out of clutching engagement, guides in the male member in which said keys move and by which they are held to a straight line movement, a shaft on which said male member is mounted and to which it is keyed.

5. A clutch having a female member with an internal cylindrical clutching surface, a male member having its axis concentric with the female member, the male member being placed inside of the female member and having clutching surfaces eccentric to the female member, rollers carried on the eccentric surfaces of the male member and adapted to make clutching engagement with the cylindrical surface of the female member, means carried on the male member for holding the rollers in line between the two members, keys moving parallel to the axis of the clutch for pushing the rollers out of clutching position, each of said keys being located near the periphery of the male member and having a cam thereon adapted to push the rollers out of clutching engagement, guides in the male member in which said keys move and by which they are held to a straight line movement, a shaft on which said male member is mounted and to which it is keyed.

6. A clutch having a female member with an internal cylindrical clutching surface, a male member having its axis concentric with the female member and being placed inside the female member and having clutching surfaces eccentric to the female member, rollers interposed between the male member and the female member, said rollers being normally held in clutching position, a key moving parallel to the axis of the clutch for pushing the rollers out of clutching position, a block interposed between the key and the roller through which the key pushes the roller out of clutching position, means on the male member for holding the key and block and roller in proper relation to each other, said key being located near the periphery of the male member and having a cam thereon adapted to push the rollers out of clutching engagement, a guide in the male member in which said key moves and by which it is held to a straight line movement, a shaft on which said male member is mounted and to which it is keyed.

7. The combination of a shaft, two oppositely disposed clutches having male members keyed to said shaft, radial flange plates on said male members, female members having bushings therein riding on said flange plates, rollers interposed between the male members and the female members, said female members being in two sections, bolts connecting the two sections together, said female members being cut away on either side of the clutching surface to form a T-shaped section that engages between the flange plates.

8. A clutch having one member having a cylindrical surface, the other member having eccentric surfaces, rollers interposed between the two members capable of moving into and out of engaging position, springs normally holding the rollers in engaging position, cam-shaped keys for pushing the rollers out of engaging position, blocks interposed between the rollers and the keys by which the rollers are pushed out of engaging position by the keys, said keys moving parallel to the axis of the clutch, each of said keys being located near the periphery of the member having eccentric surfaces, guides in said member in which said keys move and by which they are held to a straight line movement, a shaft on which said member having eccentric surfaces is mounted and to which it is keyed.

9. An overrunning roller clutch comprising a pair of rotatable members, one of said members having a cylindrical surface, the other of said members having a surface bearing a wedging relation to said cylindrical surface, rollers between said surfaces for wedging action between said surfaces, springs normally holding said rollers in engaged position between said surfaces, cam-shaped keys at the periphery moving in a straight line axially along the clutch for disengaging said rollers from said cylindrical surface, blocks or rods interposed between said rollers and said cam-shaped keys, said cam-shaped keys adapted to push said blocks or rods against said rollers so as to disengage said rollers from said cylindrical surface, means for guiding said rollers into and out of engaged position, said guiding means also being adapted to hold said rollers out of engagement with said cylindrical surface after said rollers have been disengaged from said cylindrical surface by said blocks or rods and said cam-shaped keys.

10. A transmission comprising, a shaft, a gear freely rotatable thereon, a pair of overrunning roller clutches adapted to overrun in opposite directions drivably connected to said shaft, cam-shaped keys at the periphery moving in a straight line axially along the clutch for connecting said gear with said shaft through one or both of said clutches selectively.

11. A transmission comprising, a shaft, a gear freely rotatable thereon, an overrunning clutch adapted to overrun in opposite directions drivably connected to said shaft, cam-shaped keys at the periphery moving in a straight line axially along the clutch for connecting said gear with said shaft in one direction or for the opposite direction selectively.

12. In a transmission, a shaft, a gear rotatably mounted thereon, a pair of oppositely disposed overrunning clutch members splined to said shaft, and a pair of complementary clutch members on said gear, cam-shaped keys at the periphery moving in a straight line axially along the clutch for engaging said clutch members selectively.

13. A clutch having a female member with an internal cylindrical clutching surface, a male member being placed inside of said female member and having clutching surfaces eccentric to the cylindrical clutching surface of said female member, rollers interposed between the clutching surfaces of the male and female members, said rollers being capable of moving into and out of clutching position between said clutching surfaces, springs normally holding said rollers in clutching position, cam-shaped keys moving in a straight line for pushing said rollers out of clutching position, blocks or rods interposed between said rollers and said cam-shaped keys by which said rollers are pushed out of clutching position by said cam-shaped keys, radial flange plates positively fastened to said male member, said flange plates having slots which are eccentric to the cylindrical clutching surface of said female member, the ends of said rollers being inserted in said eccentric slots which hold the rollers properly in place between said clutching surfaces and guides them into and out of clutching position, said eccentric slots also holding said rollers out of engagement with the cylindrical clutching surface of said female members when clutch is idling, said flange plates having holes through which said cam-shaped keys can slide, bearing surfaces on said male member, the cylindrical clutching surface of said female member adapted to rotate freely on said bearing surfaces when clutch is idling, a gear positively attached to said female member, said female member being cut away on either side of its cylindrical clutching surface to form a T-shaped section that is loosely enclosed between said flange plates, bushings pressed into the sides of said female member, said radial flange plates extending outward and beyond said internal cylindrical clutching surface, said flange plates being capable of rotating freely inside of said bushings when clutch is idling, a splined shaft positively attached to said male member, a grooved sleeve splined on said shaft and adapted to slide along the splines of said shaft, said cam-shaped keys being positively attached to said grooved sleeve.

NICHOLAS A. COLUCCI.